US010042276B2

(12) United States Patent
Bar-Haim et al.

(10) Patent No.: US 10,042,276 B2
(45) Date of Patent: Aug. 7, 2018

(54) ELECTROSTATIC INK COMPOSITIONS

(71) Applicant: HP Indigo B.V., Amstelveen (NL)

(72) Inventors: Gil Bar-Haim, Holon (IL); Alina Grishman, Rehovot (IL); Ilanit Mor, Kiryat Ono (IL); Albert Teishev, Rishon le-zion (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/129,653

(22) PCT Filed: Apr. 30, 2014

(86) PCT No.: PCT/EP2014/058927
§ 371 (c)(1),
(2) Date: Sep. 27, 2016

(87) PCT Pub. No.: WO2015/165542
PCT Pub. Date: Nov. 5, 2015

(65) Prior Publication Data
US 2017/0146919 A1    May 25, 2017

(51) Int. Cl.
*G03G 9/135* (2006.01)
*G03G 9/097* (2006.01)
*G03G 9/08* (2006.01)

(52) U.S. Cl.
CPC ....... *G03G 9/09775* (2013.01); *G03G 9/0808* (2013.01)

(58) Field of Classification Search
CPC .............................. G03G 9/135; G03G 9/1355
See application file for complete search history.

(56) References Cited

U.S. PATENT DOCUMENTS

| 4,062,789 | A |   | 12/1977 | Tamai et al. |
| 4,156,034 | A |   | 5/1979 | Mukoh et al. |
| 4,891,286 | A |   | 1/1990 | Gibson |
| 5,066,821 | A |   | 11/1991 | Houle et al. |
| 5,346,796 | A | * | 9/1994 | Almog ............... G03G 9/135 430/114 |
| 5,501,934 | A |   | 3/1996 | Sukata et al. |
| 5,667,927 | A |   | 9/1997 | Kubot et al. |
| 6,140,000 | A |   | 10/2000 | Yamashita |

(Continued)

FOREIGN PATENT DOCUMENTS

| EP | 1634931 | 3/2006 |
| JP | H0222670 | 1/1990 |

(Continued)

OTHER PUBLICATIONS

International Search Report and Written Opinion for International Application No. PCT/EP2014/058927 dated Jan. 22, 2015, 8 pages.

*Primary Examiner* — Peter L Vajda
(74) *Attorney, Agent, or Firm* — Dierker & Kavanaugh PC

(57) ABSTRACT

Herein is disclosed an electrostatic ink composition, wherein the composition is formable by combining: chargeable particles comprising a resin, a charge director comprising a sulfosuccinate salt, and a non-polymeric, non-fatty acid having a $pK_a$, when measured in water at 20° C., of at least 1. Also disclosed herein is a method of forming an electrostatic ink composition, and a method of electrostatic printing.

15 Claims, 6 Drawing Sheets

(56) References Cited

U.S. PATENT DOCUMENTS

| | | | |
|---|---|---|---|
| 7,070,900 B2 | 7/2006 | Qian et al. | |
| 7,524,600 B2 | 4/2009 | Tolzumi et al. | |
| 2009/0233215 A1* | 9/2009 | Ueno | G03G 9/12 430/114 |
| 2009/0311614 A1 | 12/2009 | Almog et al. | |
| 2011/0262851 A1 | 10/2011 | Takano et al. | |
| 2012/0018683 A1* | 1/2012 | Almog | B82Y 30/00 252/519.2 |
| 2012/0196222 A1 | 8/2012 | Chun et al. | |

FOREIGN PATENT DOCUMENTS

| | | |
|---|---|---|
| WO | WO 2007/130069 | 11/2007 |
| WO | WO 2010/053480 | 5/2010 |
| WO | WO 2013/107498 | 7/2013 |

\* cited by examiner

ELECTROSTATIC INK COMPOSITIONS

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition including charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, which is often heated to fuse the solid image and evaporate the liquid carrier, and then to the print substrate.

DETAILED DESCRIPTION

Figure 1:
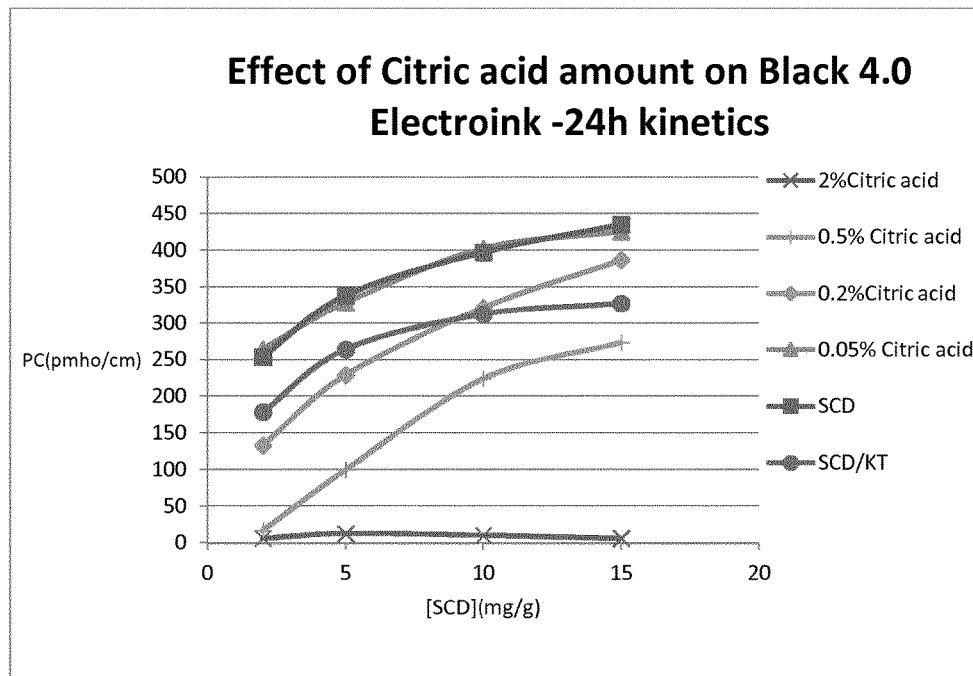
FIG. 1 shows the effect of various concentrations of citric acid and a synthetic charge director (SCD, as described in more detail in the Examples) on ink particle conductivity, against those for Comparative Example 1.

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid", "carrier," or "carrier vehicle" refers to the fluid in which the polymer resin, colorant, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, that is typically suitable for use in an electrostatic printing process, sometimes termed an electrophotographic printing process. The electrostatic ink composition may include chargeable particles of the resin and the colorant dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition comprising:
a) chargeable particles comprising a resin;
b) a charge director comprising a sulfosuccinate salt of the general formula $MA_m$, wherein M is a metal, m is the valence of M, and A is an ion of the general formula (I):

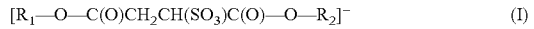

$$[R_1-O-C(O)CH_2CH(SO_3)C(O)-O-R_2]^- \qquad (I)$$

wherein each of $R_1$ and $R_2$ is an alkyl group; and
c) a non-polymeric, non-fatty acid having a $pK_a$, when measured in water at 20° C., of at least 1.

In a further aspect, there is provided a method of producing an electrostatic ink composition, the method involving:
producing chargeable particles comprising a resin;
and, before, during or after the chargeable particles comprising the resin are produced, combining the resin with
(i) a charge director comprising a sulfosuccinate salt of the general formula $MA_m$, wherein M is a metal, m is the valence of M, and A is an ion of the general formula (I):

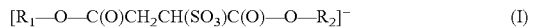

$$[R_1-O-C(O)CH_2CH(SO_3)C(O)-O-R_2]^- \qquad (I)$$

wherein each of $R_1$ and $R_2$ is an alkyl group, and
(ii) a non-polymeric, non-fatty acid having a $pK_a$, when measured in water at 20° C., of at least 1.

In a further aspect, there is provided a print substrate having printed thereon an electrostatic ink composition comprising:
a) a resin;
b) a charge director comprising a sulfosuccinate salt of the general formula $MA_m$, wherein M is a metal, m is the valence of M, and A is an ion of the general formula (I):

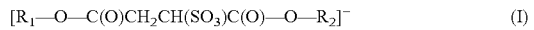

$$[R_1-O-C(O)CH_2CH(SO_3)C(O)-O-R_2]^- \qquad (I)$$

wherein each of $R_1$ and $R_2$ is an alkyl group; and
c) a non-polymeric, non-fatty acid having a $pK_a$, when measured in water at 20° C., of at least 1.

It has been found that some electrostatic inks are highly sensitive to charge director concentrations within a desired working window of particle conductivity. This can be undesirable, since keeping the ink within the target charging window requires a high degree of control of the concentration of the charge director or the resulting charging level of the electrostatic ink composition. The sensitivity of the inks to the level of charge director can be due to a number of factors, including certain additives, certain resins, or certain types of charge directors. There was a desire to reduce the sensitivity of the particle conductivity to the concentration of charge director. It was found that the addition of moderate acids has the effect of reducing the particle charge. By virtue of the relationship of the particle charge with concentration of the charge director (the gradient decreasing with the concentration of charge director), this has the effect of reducing the sensitivity of the particle conductivity to changes in charge director concentration within a desired working window of charging ability. A further advantage was that only relatively small amounts of the moderate acids could be added to achieve the desired reduction in sensitivity.

In some examples, there is provided an electrostatic ink composition comprising:
a) chargeable particles comprising a resin and a pigment, and in some examples, one or more other additives such as a charge adjuvant;
b) a charge director comprising a sulfosuccinate salt of the general formula $MA_m$, wherein M is a metal, m is the valence of M, and A is an ion of the general formula (I):

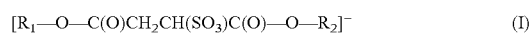

$$[R_1-O-C(O)CH_2CH(SO_3)C(O)-O-R_2]^- \qquad (I)$$

wherein each of $R_1$ and $R_2$ is an alkyl group; and
c) a non-polymeric, non-fatty acid having a $pK_a$, when measured in water at 20° C., of at least 1.

In a further aspect, there is provided a method of producing an electrostatic ink composition, the method involving:
producing chargeable particles comprising a resin and a pigment, and in some examples, one or more other additives such as a charge adjuvant;
and, before, during or after the chargeable particles comprising the resin are produced, combining the resin with
(i) a charge director comprising a sulfosuccinate salt of the general formula $MA_m$, wherein M is a metal, m is the valence of M, and A is an ion of the general formula (I):

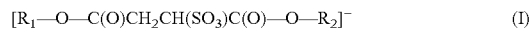

$$[R_1-O-C(O)CH_2CH(SO_3)C(O)-O-R_2]^- \qquad (I)$$

wherein each of $R_1$ and $R_2$ is an alkyl group, and
(ii) a non-polymeric, non-fatty acid having a $pK_a$, when measured in water at 20° C., of at least 1.

Non-Polymeric, Non-Fatty Acid

The non-polymeric, non-fatty acid having a $pK_a$, when measured in water at 20° C., of at least 1 may, merely for brevity, be termed a moderate acid herein.

The moderate acid is, as indicated, a non-polymeric acid. In some examples, a non-polymeric acid is different from the resin. In some examples, a non-polymeric acid is an acid that does not containing polymerised monomers having acid groups. In some examples, a polymeric acid is a polymer having acidic side groups; such a polymer is described below and may be or form part of the resin. Accordingly, in some examples, the moderate acid is not a polymer having acidic side groups, e.g. a polymer formed from the polymerisation of acrylic or methacrylic acid (which may be with another monomer such as ethylene).

The moderate acid is a non-fatty acid. In some examples, a fatty acid may be defined as a carboxyl group having covalently bonded thereto a carbon chain having 8 carbons or more, and in some examples, the carbon chain may be an aliphatic chain that is unsaturated or saturated. Accordingly, in some examples, the moderate acid is not an acid that has carboxyl group having covalently bonded thereto a carbon chain having 8 carbons or more, and in some examples, the carbon chain may be an aliphatic chain that is unsaturated or saturated. In some examples, the moderate acid lacks a carbon chain of 8 carbons or more, in some examples 10 carbons or more, in some examples 12 carbons or more, and, in some examples, said carbon chain is a straight-chain or branched-chain, and, in some examples is an alkyl chain.

In some examples, the moderate acid contains, per molecule, a total ten carbons or fewer, for example eight carbons or fewer, for example seven carbons or fewer, for example six carbons or fewer, for example five carbons or fewer, for example four carbons or fewer, for examples three carbons or fewer, for example two carbons or fewer.

In some examples, the moderate acid has a first group covalently bonded to an acid group, such as a carboxyl group (—$CO_2H$), and the first group is an optionally substituted carbon chain or ring, and the optionally substituted carbon chain or ring contains, including any substitutents, a total ten carbons or fewer, for example eight carbons or fewer, for example seven carbons or fewer, for example six carbons or fewer, for example five carbons or fewer, for example four carbons or fewer.

The moderate acid has a $pK_a$ when measured in water at 20° C., of a least 1, for example of at least 1.5, for example of at least 2, for example of at least 2.5, for example of at least 3. The moderate acid may have a $pK_a$, when measured in water at 20° C., of from 1 to 10, in some examples, from 1 to 8, in some examples from 1 to 7, in some examples from 1 to 6, in some examples from 2 to 6, in some examples from 3 to 6, in some examples from 3 to 5. Where the moderate acid is a polyacid, i.e. having a plurality of acid groups, e.g. carboxyl groups, on each molecule, the $pK_a$ value as stated herein, unless otherwise stated, is the first pKa, sometimes termed pKa1. Ka is the acid dissociation constant and $pK_a$ is the negative base-10 log of the acid dissociation constant. $pK_a$ value of moderate acids are given in a number of textbooks, for example W. P. Jencks and J. Regenstein (1976) Ionization constants of acids and bases, Handbook of Biochemistry and Molecular Biology. (Fasman, G. D., ed.), pp. 305-351, CRC Press, Cleveland, International Union of Pure and Applied Chemistry. Further, methods of discerning the $pK_a$ of moderate acids, for example ones analogous to that described in ISO Standard 31-8 Annex C, are well documented in the art. Both of these reference are incorporated herein by reference in their entirety.

The moderate acid may be selected from any suitable acid, for example the moderate acid may be selected from carboxylic acids, phenolic acids, amino acids, and optionally substituted uric acids.

In some examples, the moderate acid is a polyacid. The polyacid may be defined as a molecule having a plurality of acid groups, for example carboxyl groups. The polyacid may comprise at least two acid groups, in some examples at least three acid groups. In some examples, the polyacid may be of the formula $HO_2C$-L-$CO_2H$, wherein L is a single bond or an organic linker group. L may be an organic linker group selected from an optionally substituted aliphatic moiety and an optionally substituted aromatic moiety. In some examples, L is an optionally substituted alkylene group, and in some examples, the alkylene group is a straight chain group, and in some examples, has from 1 to 10 carbon atoms, in some examples 1 to 6 carbon atoms, in some examples 1 to 4, in some examples 1 to 3 carbon atoms, in the chain. In some examples, L is a substituted alkylene group, and in some examples, the alkylene group is a straight chain group, and in some examples, has from 1 to 10 carbon atoms, in some examples 1 to 6 carbon atoms, in some examples 1 to 4, in some examples 1 to 3 carbon atoms, in the chain, and wherein the alkylene group is substituted with at least one hydroxyl and/or carboxyl group (such that there are at least three carboxyl groups in the polyacid). In some examples, L is of the formula —$(CH_2)_x$—, wherein x is from 1 to 10, in some examples 1 to 8, in some examples 1 to 6, in some examples 1 to 5, in some examples 1 to 4, in some examples 1 to 3, in some examples, 2. In some examples, the polyacid is selected from succinic acid, oxalic acid and citric acid.

In some examples, the moderate acid is a monoacid, i.e. a compound having only a single acid group, e.g. a carboxyl group. In some examples the mono acid has an optionally substituted $C_1$ to $C_8$ alkyl group (in some examples an optionally substituted $C_1$ to $C_7$ alkyl group, in some examples an optionally substituted $C_1$ to $C_4$ alkyl group, in some examples an optionally substituted $C_1$ to $C_3$ alkyl group) covalently bonded, in some examples at a terminal carbon, to a carboxyl group. In some examples, the monoacid is selected from lactic acid, formic acid, acetic acid, propionic acid, butyric acid, valeric acid, caproic acid, enanthic acid and caprylic acid.

Aliphatic, when mentioned herein, includes, but is not limited to, linear, cyclic or branched optionally substituted alkyl, alkylene, alkene, alkenylene, alkyne and alkynylene groups, preferably alkyl or alkylene, in some examples containing from 1 to 20 carbon atoms, in some examples from 1 to 10 carbon atoms, in some examples from 1 to 8 carbon atoms, in some examples from 1 to 6 carbon atoms, in some examples from 1 to 4 carbon atoms, in some examples from 1 to 3 carbon atoms not including any substituents that may be present.

Aromatic, when mentioned herein, includes, but is not limited to, optionally substituted phenyl and optionally substituted naphthyl.

Optional substituents include, but are not limited to, hydroxyl, carboxyl, halogen, —$NO_2$, phenyl, aryl, heteroaryl, arylalkyl, alkylaryl, heteroarylalkyl, alkylheteroaryl, alkoxy, aryloxy, arylalkoxy, acyl, aroyl, cyano, alkoxycarbonyl, aryloxycarbonyl, arylalkoxycarbonyl, alkylsulfonyl, arylsulfonyl, heteroarylsulfonyl. Halogen, where mentioned herein, may be selected from fluorine, chlorine, bromine and iodine.

In some examples, the moderate acid may be a hydroxyacid. A hydroxyacid may be defined as a molecule having a hydroxyl group and an acidic group, such as a carboxyl group. The hydroxyacid may be a polyacid, in that each molecule has a plurality of acid groups and at least one hydroxyl group. In some examples, the hydroxyacid may comprise a substituted alkyl having at least one substituent that is a carboxyl group and at least one substituent that is a hydroxyl group. In some examples, the hydroxyacid may comprise a substituted alkyl, e.g. a substituted straight-chain alkyl, having at least one substituent that is a carboxyl group and at least one substituent that is a hydroxyl group, wherein the alkyl has at least 2 carbons, in some examples from 2 to 10 carbons, in some examples from 2 to 8 carbons, in some examples from 2 to 6 carbons, in some examples from 2 to 4 carbons, in some examples 2 or 3 carbons. In some examples, the hydroxyacid is an α-hydroxyacid. In some examples, a β-hydroxyacid. In some examples a γ-hydroxy acid. In some examples, the hydroxyacid is selected from citric acid, lactic acid, tartaric acid and gluconic acid.

In some examples, the moderate acid may be selected from carboxylic acids, for example the moderate acid may be selected from lactic acid, formic acid, acetic acid, propionic acid, butyric acid, valeric acid, caproic acid, enanthic acid, caprylic acid, gluconic acid, tartaric acid, citric acid, succinic acid and oxalic acid, for example the moderate acid may be selected from lactic acid, formic acid, acetic acid, citric acid and oxalic acid, for example the moderate acid may be selected from citric acid, oxalic acid, succinic acid, lactic acid and formic acid.

In some examples, the moderate acid may comprise an optionally substituted phenol. In some examples, the moderate acid may be phenol. A substituted phenol may have a substituent at an ortho- meta- or para-position, relative to the hydroxyl of the phenol, and the substituent may, in some examples, be selected from a further hydroxyl, a carboxyl, halogen, nitro, alkyl, aryl, heteroaryl, arylalkyl, alkylaryl, heteroarylalkyl, alkylheteroaryl, alkoxy, aryloxy, arylalkoxy, acyl, aroyl, cyano, alkoxycarbonyl, aryloxycarbonyl, arylalkoxycarbonyl, alkylsulfonyl, arylsulfonyl, heteroarylsulfonyl.

In some examples, the moderate acid may be selected from phenolic acids, for example the moderate acid may be selected from monohydroxybenzoic acids (such as salicylic acid, 3-hydroxybenzoic acid and 4-hydroxybenzoic acid), dihydroxybenzoic acids (such as vanillin, vanillic acid, gentisic acid and protocatechuic acid), and trihydroxybenzoic acids (such as gallic acid, ellagic acid, syringic acid, eudesmic acid and phloroglucinol carboxylic acid).

In some examples, the moderate acid may be selected from amino acids, for example the moderate acid may be selected from histidine, alanine, isoleucine, arginine, leucine, aspartic acid, lysine, cysteine, methionine, glutamic acid, phenylalanine, glutamine, threonine, glycine, tryptophan, proline, valine, serine, tyrosine, asparagines and selenocysteine.

In some examples, the moderate acid may be selected from vinylogous carboxylic acids, for example the moderate acid may be selected from ascorbic acid and Meldrum's acid.

Where the moderate acid has two or more optical isomers, e.g. an L- or D-amino acid, the moderate acid may include one of or a mixture of both, some or all of the optical isomers.

In some examples, the moderate acid may be an optionally substituted uric acid. In some examples, the moderate acid may be uric acid. In some examples, the moderate acid may be a substituted uric acid, which may be uric acid having a substituent on at least one of, in some examples two of, in some examples three of, in some examples all of, the nitrogens of the uric acid (i.e. the nitrogens forming part of the five-ring and six-ring of the uric acid), and the substituent(s) may, for example, be selected from an optionally substituted aliphatic, e.g. C1 to C5 alkyl group, and an optionally substituted aryl group, e.g. phenyl group.

The moderate acid may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.4 wt % of the solids of the electrostatic ink composition, at least 0.5 wt % of the solids of the electrostatic ink composition.

The moderate acid may constitute from 0.1 wt % to 5 wt % of the solids of the electrostatic ink composition, in some examples 0.5 wt % to 4 wt % of the solids of the electrostatic ink composition, in some examples 0.5 wt % to 3 wt % of the solids of the electrostatic ink composition, in some examples 0.5 wt % to 2.5 wt % of the solids of the electrostatic ink composition, in some examples 0.5 wt % to 2 wt % of the solids of the electrostatic ink composition, in some examples 0.5 wt % to 1.5 wt % of the solids of the electrostatic ink composition, in some examples about 1 wt % of the solids of the electrostatic ink composition (e.g. if the moderate acid is a polyacid), in some examples 1.5 wt % to 2.5 wt % of the solids of the electrostatic ink composition, in some examples about 2 wt % of the solids of the electrostatic ink composition (e.g. if the moderate acid is a monoacid). In some examples, the moderate acid is present in the amounts stated above, and the charge director is present in an amount of at least 1 mg of charge director per gram of solids of the electrostatic ink composition (which will be abbreviated to mg/g), in some examples at least 2 mg/g, in some examples at least 3 mg/g, in some examples at least 4 mg/g, in some examples at least 5 mg/g. In some examples, the moderate acid is present in the amounts stated above, and the charge director is present in an amount of from 1 mg to 50 mg of charge director per gram of solids of the electrostatic ink composition (which will be abbreviated to mg/g), in some examples from 1 mg/g to 25 mg/g, in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 5 mg/g to 10 mg/g.

Without being bound by theory, it is considered that at least some of the moderate acid, on addition to the electrostatic ink composition (or components thereof), may react with the charge director by an acid-base interaction. Since the charging of a particle is believed to be formed by a simple acid-base interaction between the charge director and the charge adjuvant (if present) or resin acids, by using a moderate acid as described above, it seems that the charge director is blocked when the moderate acid reacts with it instead the usual reaction. By blocking the charge director micelles in the liquid, the overall efficiency of the charge director is reduced on high chargeable electrostatic inks and enable the use of regular amount of charge director in which a slight change of it will not affect significantly the charging (i.e. the particle conductivity). In methods in which a charge director is added after grinding of the resin particles, it was seen that the addition of the acid toward or at the end of grinding the resin particles seemed to have more effect in reducing particle conductivity than when added during an early stage of grinding—this is believed to be because, when the acid is added toward the end of grinding, more would be present on the surface of the particle and available to interact with/react with the charge director. Additionally, it was observed that even without any charge adjuvant a significant reduction in charging was effected by the addition of the acid. It was also found that, not only the pKa, but also the chemistry of the acid in terms of the amount of acid groups in molecule of each moderate acid can have an effect on the reduction in particle charge. For example, it was found that if the acid is fatty acid, the long hydrophobic tail interferes with the interaction with charge director or if the acid has rich electrons system, this will attract the acidic proton to it rather release for interaction.

Liquid Carrier

The electrostatic ink composition may further include a liquid carrier. In some examples, the chargeable particles including the resin may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for toner particles, i.e. the chargeable particles including the resin and, in some examples, a colorant. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Colorant

The electrostatic ink composition, either before or after having been printed on the print substrate, may further include a colorant. The chargeable particles including the resin may further include the colorant. The colorant may be selected from a pigment, dye and a combination thereof. The colorant may be transparent, unicolor or composed of any combination of available colors. The colorant may be selected from a cyan colorant, a yellow colorant, a magenta colorant and a black colorant. The electrostatic ink composition and/or ink printed on the print substrate may include a plurality of colorants. The electrostatic ink composition and/or ink printed on the substrate may include a first colorant and second colorant, which are different from one another. Further colorants may also be present with the first and second colorants. The electrostatic ink composition and/or ink printed on the substrate may include first and second colorants where each is independently selected from a cyan colorant, a yellow colorant, a magenta colorant and a black colorant. In some examples, the first colorant includes a black colorant, and the second colorant includes a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof. The second or additional colorants may be added in order to shift the first colorant ink to a desired color in color space. The first colorant may be present in a quantity greater than the second colorant.

In some examples, the electrostatic ink composition includes a white colorant.

In some examples, the white colorant is selected from $TiO_2$, calcium carbonate, zinc oxide, and mixtures thereof. In some examples, the electrostatic ink composition includes a white colorant selected from rutile, anatase, and brookite, and mixtures thereof. In some examples, the electrostatic ink composition includes a white colorant in the form of rutile. The rutile form of $TiO_2$ exhibits the highest refractive index among the other forms of $TiO_2$ and the other listed pigments. All other parameters of inks being the same, the highest refractive index yields the highest opacity.

In some examples, the electrostatic ink composition or the electrostatic ink lacks a colorant. In some examples, the electrostatic ink composition or the electrostatic ink lacks inorganic particulate material. In some examples, the electrostatic ink composition or the electrostatic ink is substantially transparent when printed.

The colorant may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.5 wt % of the solids of the electrostatic ink composition, in some examples at least 1 wt % of the solids of the electrostatic ink composition. In some examples the colorant may constitute from 1 wt % to 50 wt % of the solids of the electrostatic ink composition, in some example from from 5 wt % to 40 wt % of the solids of the electrostatic ink composition, in some examples from 20 wt % to 40 wt % of the solids of the electrostatic ink composition, in some examples 25 wt % to 35 wt % of the solids of the electrostatic ink composition in some examples 5 wt % to 20 wt % of the solids of the electrostatic ink composition.

The colorant may include a pigment. The pigments can be any pigment compatible with the liquid carrier and useful for electrostatic printing. For example, the pigment may be present as pigment particles, or may include a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

Resin

The electrostatic ink composition includes a resin, which may be a thermoplastic resin. A thermoplastic polymer is sometimes referred to as a thermoplastic resin. The resin may coat a colorant, e.g. a pigment, such that the particles include a core of colorant, and have an outer layer of resin thereon. The outer layer of resin may coat the colorant partially or completely.

The resin includes a polymer. In some examples, the polymer of the resin may be selected from ethylene or propylene acrylic acid co-polymers; ethylene or propylene methacrylic acid co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethyleneacrylic acid ionomers and combinations thereof. The resin may further include other polymers, including, but not limited to, ethylene vinyl acetate co-polymers; co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; ethylene-acrylate terpolymers: ethyleneacrylic esters-maleic anhydride (MAH) or glycidyl methacrylate (GMA) terpolymers The resin may include a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may include a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer including acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may include two different polymers having acidic side groups. The two polymers having acidic side groups may have different acidities, which may fall within the ranges mentioned above. The resin may include a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may include two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may include a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may include a first polymer having a melt viscosity of 15000 poise or more, in some examples 20000 poise or more, in some examples 50000 poise or more, in some examples 70000 poise or more; and in some examples, the resin may include a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may include a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition includes a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin includes a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may include two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may include (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may include a polymer having acidic side groups, as described above (which may be free of ester side groups), and a polymer having ester side groups. The polymer having ester side groups may be a thermoplastic polymer. The polymer having ester side groups may further include acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

In some examples, the colorant constitutes a certain wt %, e.g. from 1 wt %, to 30 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a colorant and, in some examples, any other additives that may be present.

Charge Director and Charge Adjuvant

The electrostatic ink composition includes a charge director. The charge director may be added to an electrostatic ink composition in order to impart and/or maintain sufficient electrostatic charge on the ink particles. The charge director includes a sulfosuccinate salt of the general formula $MA_m$, where M is a metal, m is the valence of M, and A is an ion of the general formula $[R_1-O-C(O)CH_2CH(SO_3^-)C(O)-O-R_2]^-$, where each of $R_1$ and $R_2$ is an alkyl group. In some examples, the charge director includes nanoparticles of a simple salt and a sulfosuccinate salt of the general formula $MA_m$, wherein M is a metal, m is the valence of M, and A is an ion of the general formula $[R_1-O-C(O)CH_2CH(SO_3^-)C(O)-O-R_2]$, where each of $R_1$ and $R_2$ is an alkyl group, or other charge directors as found in WO2007130069, which is incorporation herein by reference in its entirety. As described in WO2007130069, the sulfosuccinate salt of the general formula $MA_m$ is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, $NH_4$, tert-butyl ammonium, $Li^+$, and $Al+3$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F-$, $ClO_4-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)3$, $LiClO_4$ and $LiBF_4$, or any sub-group thereof. The charge director may further include basic barium petronate (BBP).

In the formula $[R_1—O—C(O)CH_2CH(SO_3^-)C(O)—O—R_2]$, in some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is a Group 1 or Group 2 metal of the period table, and in some examples is selected from Na, K, Cs, Ca, or Ba. The formula $[R_1—O—C(O)CH_2CH(SO_3^-)C(O)—O—R_2]$ and/or the formula $MA_m$ may be as defined in any part of WO2007130069.

The charge director may also include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

In some examples, the charge director is present in an amount of from 1 mg to 25 mg of charge director per gram of solids of the electrostatic ink composition (which will be abbreviated to mg/g), in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 5 mg/g to 10 mg/g.

The electrostatic ink composition may include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethyl-hexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Method of Forming an Electrostatic Ink Composition

Also provided in an aspect is an the electrostatic ink formable by the method described herein. Also provided herein is a method of producing an electrostatic ink composition, the method involving:

producing chargeable particles comprising a resin;
and, before, during or after the chargeable particles comprising the resin are produced, combining the resin with
(i) a charge director comprising a sulfosuccinate salt of the general formula $MA_m$, wherein M is a metal, m is the valence of M, and A is an ion of the general formula (I):

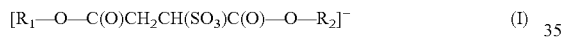
$[R_1-O-C(O)CH_2CH(SO_3)C(O)-O-R_2]^-$ (I)

wherein each of $R_1$ and $R_2$ is an alkyl group, and
(ii) a non-polymeric, non-fatty acid having a $pK_a$, when measured in water at 20° C., of at least 1. In some examples, the method involves
producing the chargeable particles comprising the resin;
and, before or during producing the chargeable particles comprising the resin, combining the resin with
the non-polymeric, non-fatty acid having a $pK_a$, when measured in water at 20° C., of at least 1,
and then adding to the chargeable particles the charge director comprising a sulfosuccinate salt of the general formula $MA_m$, wherein M is a metal, m is the valence of M, and A is an ion of the general formula (I):

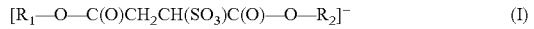
$[R_1-O-C(O)CH_2CH(SO_3)C(O)-O-R_2]^-$ (I)

wherein each of $R_1$ and $R_2$ is an alkyl group.

In some examples, a charge adjuvant, which may be as described herein, e.g. a salt of multivalent cation and a fatty acid anion, may be added before or during producing the chargeable particles comprising the resin. Producing the chargeable particles comprising the resin may include grinding the resin together with the non-polymeric, non-fatty acid, a charge adjuvant (if present), in some examples in a liquid carrier and/or in some examples, a colorant.

In an aspect, there is provided an electrostatic ink composition comprising chargeable particles comprising a resin, wherein the composition is formable by a method involving:

producing chargeable particles comprising a resin;
and, before, during or after the chargeable particles comprising the resin are produced, combining the resin with (i) a charge director comprising a sulfosuccinate salt of the general formula $MA_m$, wherein M is a metal, m is the valence of M, and A is an ion of the general formula (I):

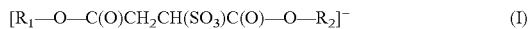
$[R_1-O-C(O)CH_2CH(SO_3)C(O)-O-R_2]^-$ (I)

wherein each of $R_1$ and $R_2$ is an alkyl group, and
(ii) a non-polymeric, non-fatty acid having a $pK_a$, when measured in water at 20° C., of at least 1.

In the method herein, the chargeable particles may be formed before, during or after contacting the resin and the non-polymeric, non-fatty acid.

In some examples, the method of forming an electrostatic ink composition includes:
combining a liquid carrier, a resin, a pigment, a non-polymeric, non-fatty acid having a $pK_a$, when measured in water at 20° C., of at least 1, and a charge director comprising a sulfosuccinate salt of the general formula $MA_m$, wherein M is a metal, m is the valence of M, and A is an ion of the general formula (I):

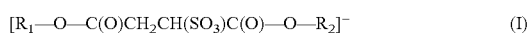
$[R_1-O-C(O)CH_2CH(SO_3)C(O)-O-R_2]^-$ (I)

wherein each of $R_1$ and $R_2$ is an alkyl group, such that the electrostatic ink composition is formed, wherein the method involves grinding the liquid carrier, the resin and a pigment, to form chargeable particles including the resin and the pigment, and the non-polymeric, non-fatty acid is added to the composition before, during or after the grinding the liquid carrier, the resin and the pigment, and the charge director is added after the grinding. Grinding in the present disclosure may indicate a method involving the shearing of the resins, which has the effect of producing particles from resin and/or reducing the particle size of the particles comprising the resin. Grinding may include milling the resin in a ball mill with the other components as described.

In some examples, the method of forming an electrostatic ink composition, includes:
combining a liquid carrier, chargeable particles including a resin, a pigment, a non-polymeric, non-fatty acid having a $pK_a$, when measured in water at 20° C., of at least 1, and, a charge director comprising a sulfosuccinate salt of the general formula $MA_m$, wherein M is a metal, m is the valence of M, and A is an ion of the general formula (I):

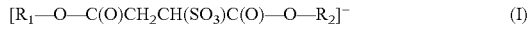
$[R_1-O-C(O)CH_2CH(SO_3)C(O)-O-R_2]^-$ (I)

wherein each of $R_1$ and $R_2$ is an alkyl group, such that the electrostatic ink composition is formed.

The method can include mixing the resin and the liquid carrier under appropriate conditions, in some examples in the presence of a non-polymeric, non-fatty acid having a $pK_a$, when measured in water at 20° C., of at least 1 and/or a pigment and/or a charge adjuvant, such as aluminium stearate, to form the particles including the resin, and, in some examples, non-polymeric, non-fatty acid or reaction product thereof, and/or a pigment and/or a charge adjuvant, within the liquid carrier; and then mixing the charge director with the liquid carrier and, if a non-polymeric, non-fatty acid has not already been added, the non-polymeric, non-fatty acid. One or more further additives as described herein may be added at any time during the method. The steps described above are not intended to be bound by any particular order. For example, the mixing of the resin with the liquid carrier may be performed before, after, or concurrently with the step of combining the charge director and/or non-polymeric, non-fatty acid with the liquid carrier. Additionally, the steps may be combined or performed in a different order as is known in the art. Additionally, the steps may include other necessary processing steps as is known in the art.

The method can include grinding the chargeable particles (comprising the resin) and the non-polymeric, non-fatty acid together, with or without other components. The inventors have found that the less time the non-polymeric, non-fatty acid and chargeable particles are ground together for (i.e. late addition of the non-polymeric, non-fatty acid into the grinding process), the more effective the charging suppression. Therefore, in some examples, the method of forming an electrostatic ink composition includes:

combining a liquid carrier, a resin, a pigment, a non-polymeric, non-fatty acid having a $pK_a$, when measured in water at 20° C., of at least 1, and a charge director comprising a sulfosuccinate salt of the general formula $MA_m$, wherein M is a metal, m is the valence of M, and A is an ion of the general formula (I):

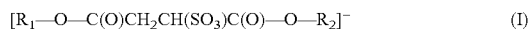

(I)

wherein each of $R_1$ and $R_2$ is an alkyl group, such that the electrostatic ink composition is formed, wherein the method involves grinding the liquid carrier, the resin and a pigment, to form chargeable particles including the resin and the pigment, and the non-polymeric, non-fatty acid is added to the composition during grinding the liquid carrier, the resin and the pigment, and the charge director is added after the grinding. In some examples, the resin is ground (in some examples with a charge adjuvant and/or in the presence of a liquid carrier and/or a pigment) for a period of time, and the non-polymeric, non-fatty acid is added to the resin being ground during the last 50% of the period of time, in some examples during the last 40% of the period of time, during the last 30% of the period of time, in some examples during the last 20% of the period of time, in some examples during the last 10% of the period of time. In some examples, the resin is ground (in some examples with a charge adjuvant and/or in the presence of a liquid carrier and/or a pigment) for a period of time, and the non-polymeric, non-fatty acid is added to the resin being ground during the first 50% of the period of time, in some examples during the first 40% of the period of time, during the first 30% of the period of time, in some examples during the first 20% of the period of time, in some examples during the first 10% of the period of time. The addition toward the beginning of grinding may be desirable if it is not desired to reduce the charging of the particles to a great extent, but only to a moderate extent. The period of time may be at least 15 minutes, in some examples at least 30 minutes, in some examples at least one hour, in some examples from 1 hour to 20 hours, in some examples from 1 hour to 15 hours, in some examples from 5 to 15 hours.

Printing Process and Print Substrate

Also provided is a method of electrostatic printing, the method including:
providing an electrostatic ink composition as described herein,
contacting the electrostatic ink composition with a latent electrostatic image on a surface to create a developed image,
transferring the developed image to a print substrate, in some examples via an intermediate transfer member.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

Without being bound by theory, it is considered that the addition of a moderate acid into the ink particle composition provides an option to block the charge director micelles in a liquid carrier which is a desirable condition for the charging of the electroink, since the charging mechanism involves an acid-base interaction between the acidic leaving group on the ink particle and the highly basic core of the charge director micelle. By having a stronger acid additive in the form of the moderate acid, there is a higher probability of a stronger interaction between the moderate acid and the charge director core, for example $BaHPO_4$ nanoparticle salt in an SCD micelle.

EXAMPLES

The following illustrates examples of the methods and other aspects described herein. Thus, these Examples should not be considered as limitations of the present disclosure, but are merely in place to teach how to make examples of the present disclosure.

In the following examples, 'Isopar' is Isopar™ L Fluid, produced by ExxonMobil and having CAS Number 64742-48-9.

In the following examples, SCD is synthetic charge director, being a barium bis sulfosuccinate salt as described in US 2009/0311614 or WO2007130069, namely a sulfosuccinate moiety of the general formula [$R_1$—O—C(O)CH$_2$CH(SO$_3^-$)OC(O)—O—$R_2$·], wherein each of $R_1$· and $R_2$· independently is a $C_{6-25}$ alkyl, generally mainly $C_{13}$ alkyl. In the following examples, SCD/KT is the synthetic charge director and natural soy lecithin mixed in a ratio of 6:1 by weight.

In the following examples, black pigment is a mixture of pigments comprising a primary pigment (Monarch 800 provided by Cabot pigment Black 7; termed Mon 800 for brevity below) and a secondary pigment (Alkali blue D6200 by Flint Group, pigment blue 61; termed FB55 for brevity below).

The general procedure used in the present Examples for producing the electrostatic ink composition is described in various patent applications such as in WO2013044991, Example 1, and WO2013/107498.

Comparative Example 1

This ink formulation was produced using a lab grinding tool called attritor S1, by mixing the formulation as set out below in Table I:

TABLE I

| Cyan | wt % |
| --- | --- |
| Resins | 9-25.5 |
| Mon 800 | 1-6 |
| FB55 | 0.075-1.75 |
| VCA | 1.20.075-1.75 |
| Sol-L | 65-88.5 |
| Total weight atr. | 2300 |

The 'Resins' used in the above were Nucrel 699, available from DuPont, and A-C 5120, available from Honeywell, in the weight ratio of 4:1.

VCA indicates an aluminium tristearate and palmitate salt, available from Sigma-Aldrich HPB indicates an homopolymer polyethylene wax, available under the trade name Acumist B6 from Honeywell company.

Sol-L indicates Isopar L, an iso-parfinic oil manufactured by EXXON.

The HPB was added later to the ink dispersion while mixing.

The grinding was carried out in two steps:
i) Hot stage—50-57° C. for 1.5 hour.
ii) Cold stage—36-45° C. for 10.5 hour.

This produced an ink having about 20% solids content. This ink is then diluted to 2% NVS, and then the following additives added, as shown in Table II:

TABLE II

| W-12 | SCD* | SVM | SE-15 | Marcol | HPB |
| --- | --- | --- | --- | --- | --- |
| 1-6% W12/ink solids | 1-20 mg SCD/g solids | 0.001-0.1 mg SVM300/gr Sol-L | 0.001-0.01 mg SE15/gr Sol-L | 2-15 mg M-1/ gr Sol-L | 2-8% on solids |

*unless stated otherwise below - varied in the Examples - see results (e.g. Figures) for amounts added.

W12 is a Teflon powder.

SVM is high viscous, 300 kcSt, Silicon oil, available under the trade name SIG5840 from ABCR SE-15 is a defoamer silicon additive, available under the trade name KSG-15 from ShinEtsu.

Marcol is a high viscous paraffinic oil with a viscosity of 0.83 gr/cc.

In the Examples below, the amount of black pigment may be varied from 7 to 36% by weight of the solids of the electrostatic ink composition.

Example 2

A black electrostatic ink composition was made according to Comparative Example 1 using SCD, except that during the grinding process various amounts of citric acid (pK$_{a1}$=3.14) and charge director were added, according to the concentrations shown in FIG. 1. The citric acid was added at the beginning of the grinding. The citric acid was sourced from Sigma-Aldrich®. FIG. 1 shows the effect of various concentrations of citric acid and SCD on ink particle conductivity against those for Comparative Example 1.

By using 2 wt % of ink solids of citric acid, the charging of the Black Electroink is eliminated. However, by using lower concentrations of citric acid the charging reduction effect is smaller, so that at around 0.2% citric acid the particle conductivity shown in FIG. 1 is achieved.

Example 3

Figure 2:
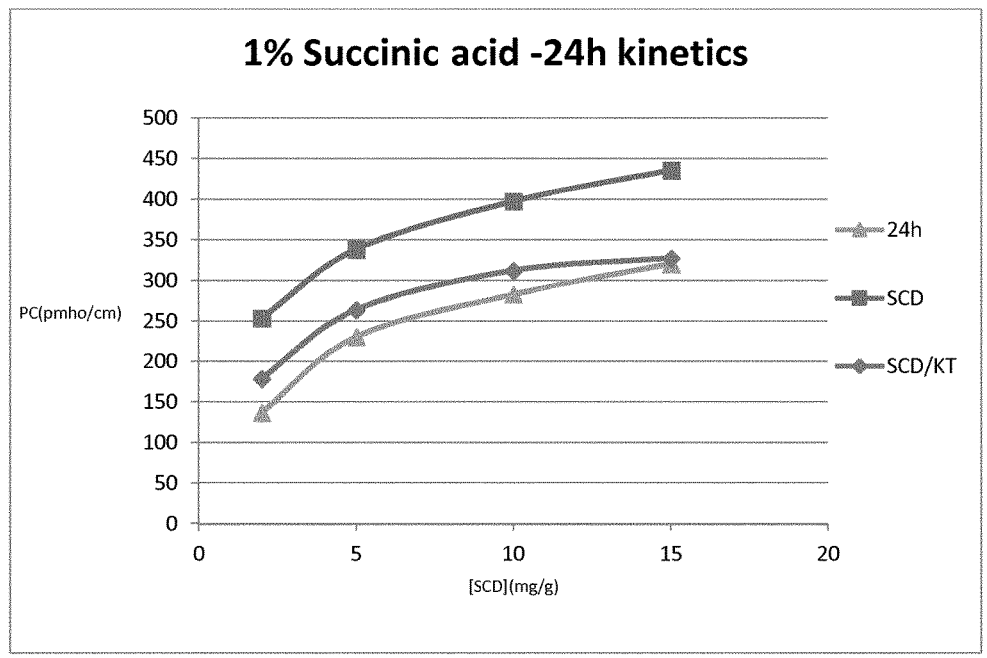
FIG. 2 shows the effect of 1% succinic acid and various concentrations of SCD on ink particle conductivity against those for Comparative Example 1. The succinic acid was added early in the grinding process.

A black electrostatic ink composition was made according to Example 2 except that, instead of using various amounts of citric acid, a concentration of 1% succinic acid (pK$_{a1}$=4.2) was used. The succinic acid was sourced from Sigma-Aldrich®. FIG. 2 shows the effect of 1% succinic acid and various concentrations of SCD on ink particle conductivity against those for Comparative Example 1. The succinic acid was added early in the grinding process.

Example 4

Figure 3:
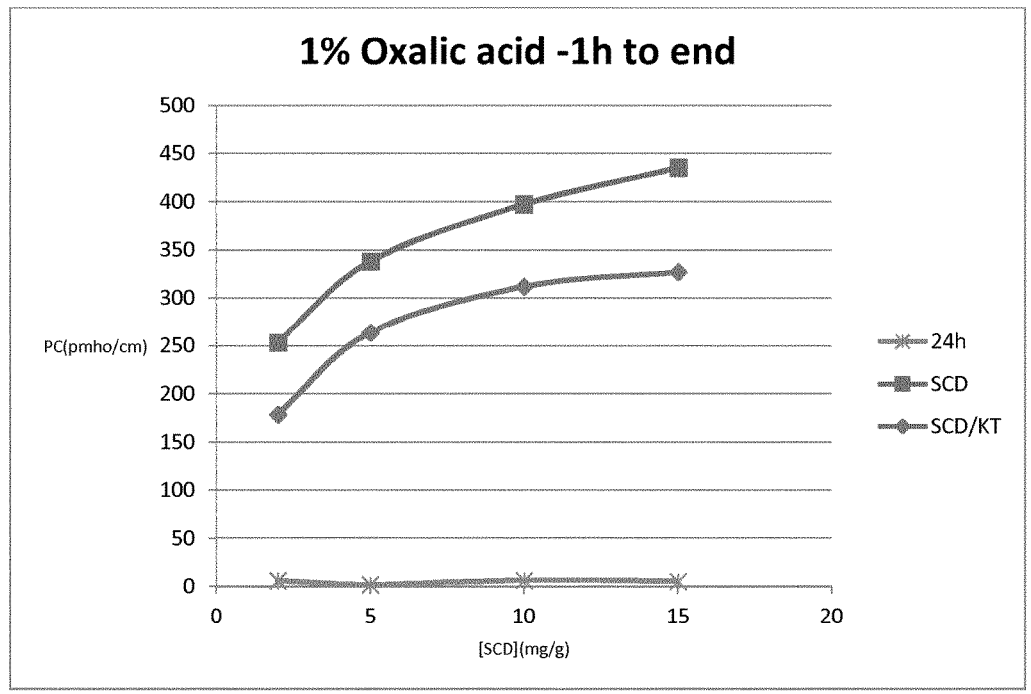
FIG. 3 shows the effect of 1% oxalic acid and various concentrations of SCD on ink particle conductivity against those for Comparative Example 1. The oxalic acid was added late in the grinding process.

A black electrostatic ink composition was made according to Example 2 except that, instead of using various amounts of citric acid, a concentration of 1% oxalic acid (pK$_{a1}$=1.27) was used. The oxalic acid was sourced from Sigma-Aldrich®. FIG. 3 shows the effect of 1% oxalic acid and various concentrations of SCD on ink particle conductivity against those for Comparative Example 1. The oxalic acid was added late in the grinding process.

While these two bi-functional acids (Examples 3 and 4) react slightly differently when added at the same stage of grinding process, we can see that, broadly, acid added at the start of grinding achieved a desirable ink particle conductivity, while a similar acid amount added at the end of the grinding process eliminated the charging, probably by providing more groups on the ink particle surface for interaction with outside.

Example 5

Figure 5:
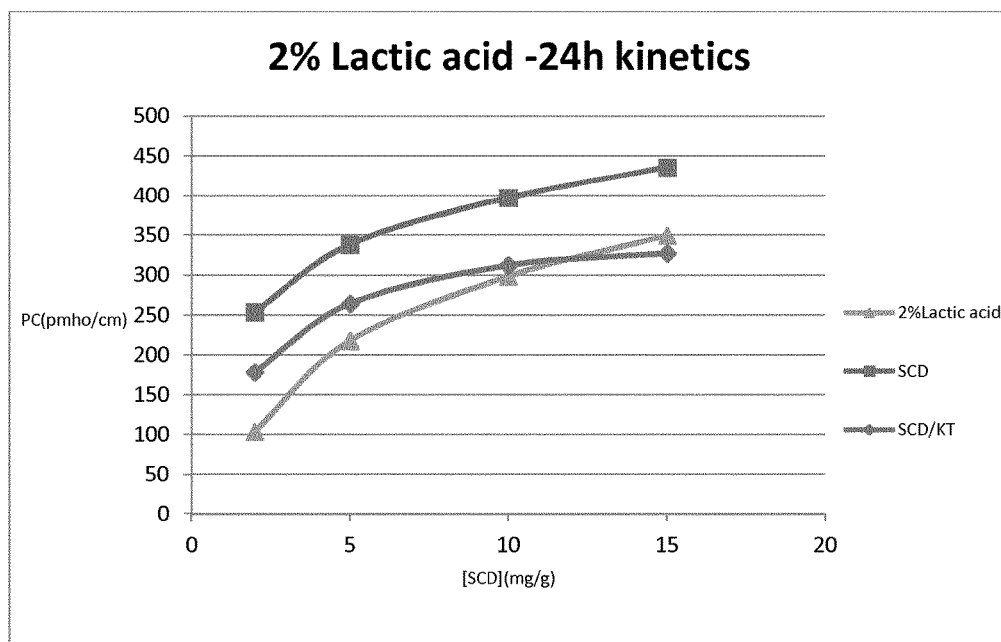
FIG. 5 shows the effect of 2% lactic acid and various concentrations of SCD on ink particle conductivity, against those for Comparative Example 1.

A black electrostatic ink composition was made according to Example 2 except that, instead of using various amounts of citric acid, a concentration of 1% lactic acid (pK$_a$=3.86) was used. The lactic acid was sourced from Sigma-Aldrich®. FIG. 5 shows the effect of 2% lactic acid and various concentrations of SCD on ink particle conductivity, against those for Comparative Example 1.

Example 6

Figure 4:
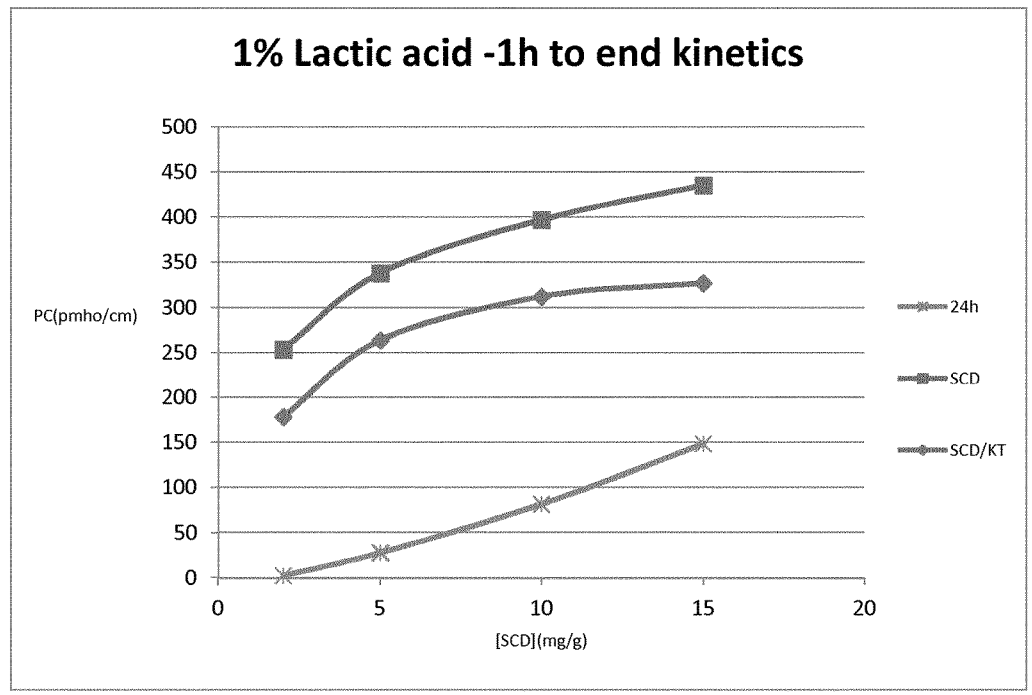
FIG. 4 shows the effect of 1% lactic acid and various concentrations of SCD on ink particle conductivity, against those for Comparative Example 1.

A black electrostatic ink composition was made according to Example 2 except that, instead of using 2% lactic acid, 1% lactic acid was used. FIG. 4 shows the effect of 1% lactic acid and various concentrations of SCD on ink particle conductivity, against those for Comparative Example 1.

When testing a mono-functional acid (Examples 5 and 6), such a lactic acid, it can be seen that, to obtain a similar performance to that of bi-functional acids, a larger concentration of acid is needed (although this is not a direct comparison because the chemistry is slightly different).

Another parameter evaluated was the shape of the charging plot, which sometimes is more sharp and less saturated when compared to the saturation known from reference charging profiles of electrostatic ink compositions. In addition, it can again be seen that adding lactic acid at the end of grinding process improves the effect, probably due to 'crowning' of the ink particle surface.

Example 7

Figure 6:
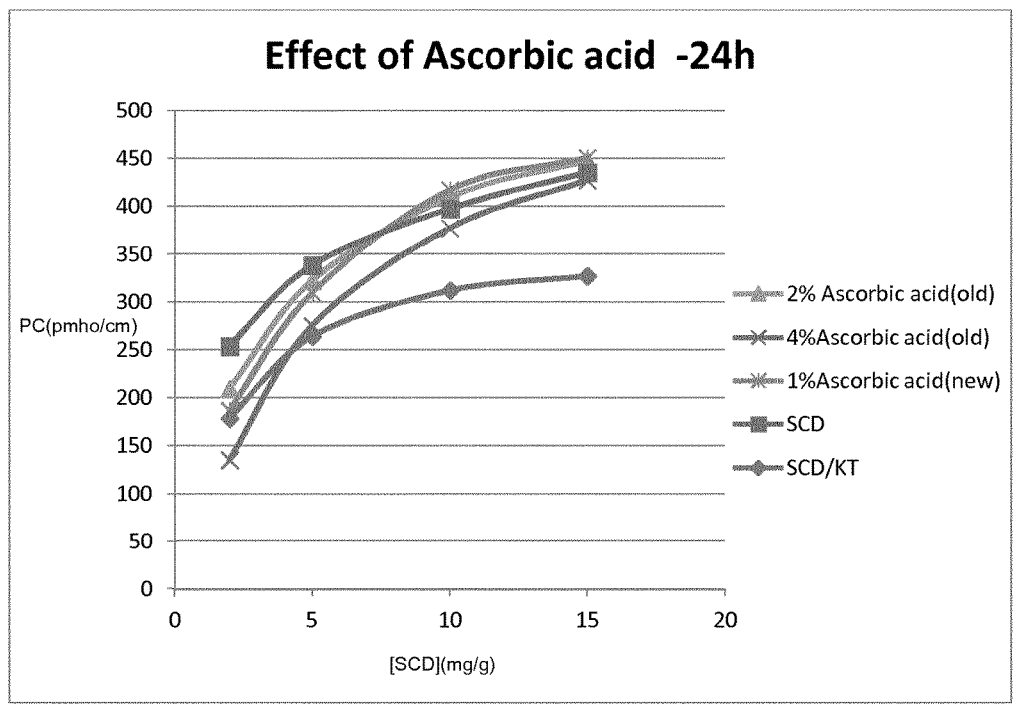
FIG. 6 shows the effect of 1-4% ascorbic acid and various concentrations of SCD on ink particle conductivity, against those for Comparative Example 1. The ascorbic acid was added at the start of grinding.

A black electrostatic ink composition was made according to Example 2 except that, instead of using various amounts of citric acid, a concentration of up to 4% ascorbic acid (a mono-functional acid) was used. The ascorbic acid was sourced from Sigma-Aldrich®. FIG. 6 shows the effect of 1-4% ascorbic acid and various concentrations of SCD on ink particle conductivity, against those for Comparative Example 1. The ascorbic acid was added at the start of grinding. With ascorbic acid, the effect was smaller, but increased slightly when increasing the acid concentration up to 4%. In this case the hydroxyl side group might interfere with the interaction with the acid group. In addition, since the the hydroxyl and carbonyl groups sit on two carbons, the possibility to expand the carbonyl double bond to the hydroxyl group in order have a stable O—C—O group in order to release a proton, is smaller and this is believed to be why the efficiency of ascorbic acid is low. Another reason is that the conjugated system in cyclic acids stabilizes better the proton due delocalization which results in lower effectiveness, as also observed in benzoic acid.

Example 8

Figure 7:
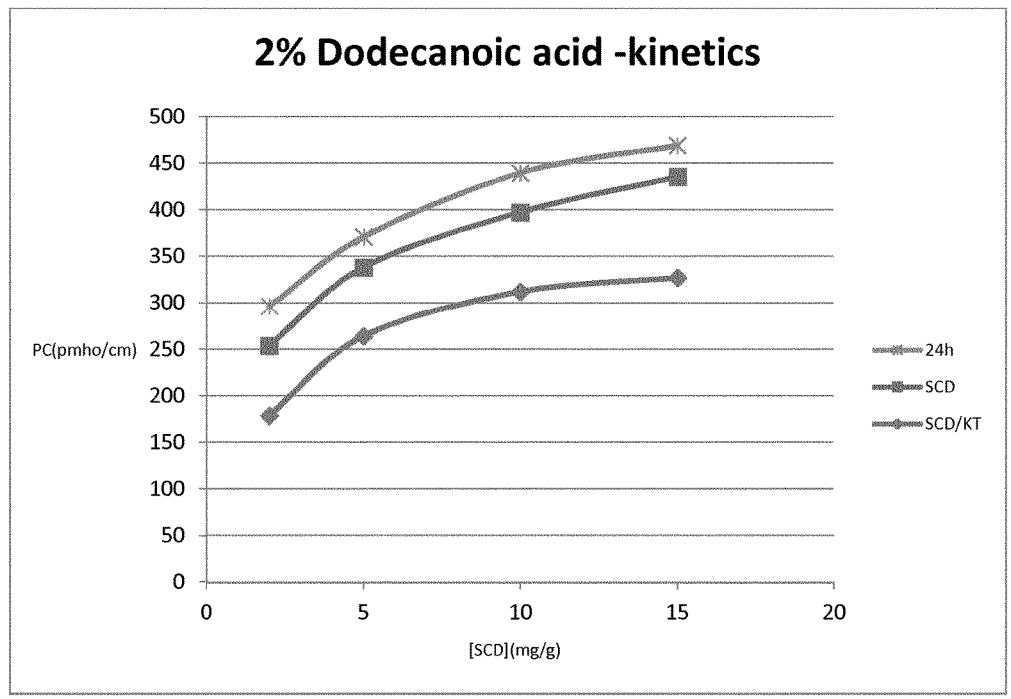
FIG. 7 shows the effect of 2% dodecanoic acid and various concentrations of SCD on ink particle conductivity, against those for Comparative Example 1. The dodecanoic acid was added at the start of grinding.

A black electrostatic ink composition was made according to Example 2 except that, instead of using various amounts of citric acid, a concentration of 2% deodecanoic acid was used. The deodecanoic acid was sourced from Sigma-Aldrich®. FIG. 7 shows the effect of 2% deodecanoic acid and various concentrations of SCD on ink particle conductivity, against those for Comparative Example 1. The dodecanoic acid was added at the start of grinding.

Example 9

Figure 8:
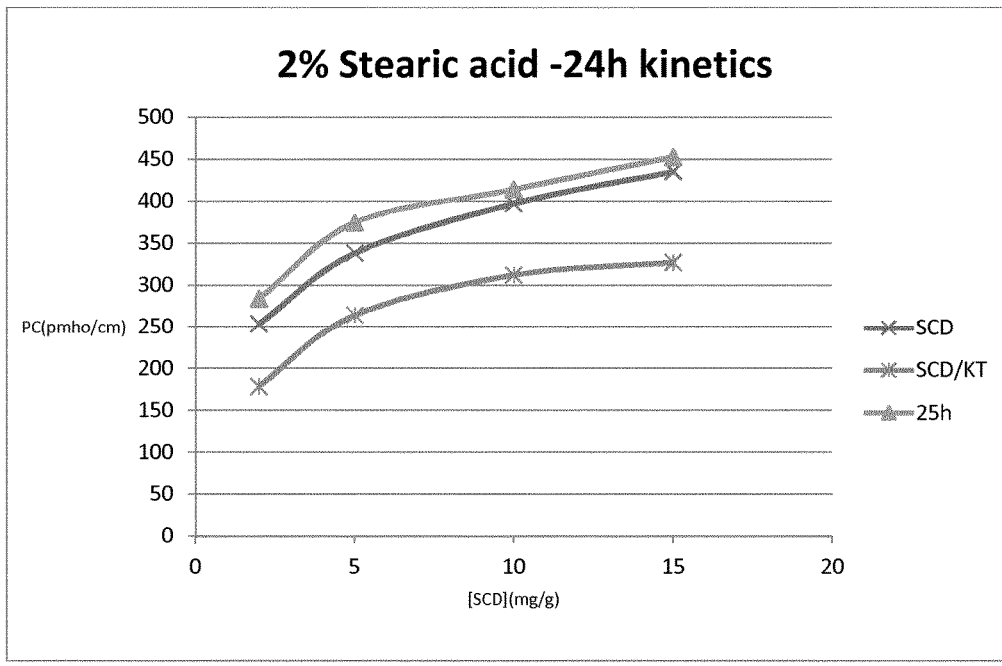
FIG. 8 shows the effect of 2% stearic acid and various concentrations of SCD on ink particle conductivity against those for Comparative Example 1.

A black electrostatic ink composition was made according to Example 2 except that, instead of using various amounts of citric acid, a concentration of 2% stearic acid was used. The stearic acid was sourced from Sigma-Aldrich®. FIG. 8 shows the effect of 2% stearic acid and various concentrations of SCD on ink particle conductivity against those for Comparative Example 1.

Deodecanoic acid (Example 8) and stearic acid (Example 9) are long, mono-functional organic acids with a much higher mass than a regular organic acid. The bad result obtained with dodecanoic acid is probably due to the mass of this acid, where the amount of net functional groups is much smaller in addition to steric interference for the reaction of the acid carboxylic group with the environment. In addition, due to this long hydrophobic hydrocarbon tail the acidity is much smaller or pKa would need to be much positive for this acid to have an effect. This long tail is considered to provide a steric hindrance that limits interaction with species such as the charge director.

Example 10

Figure 9:
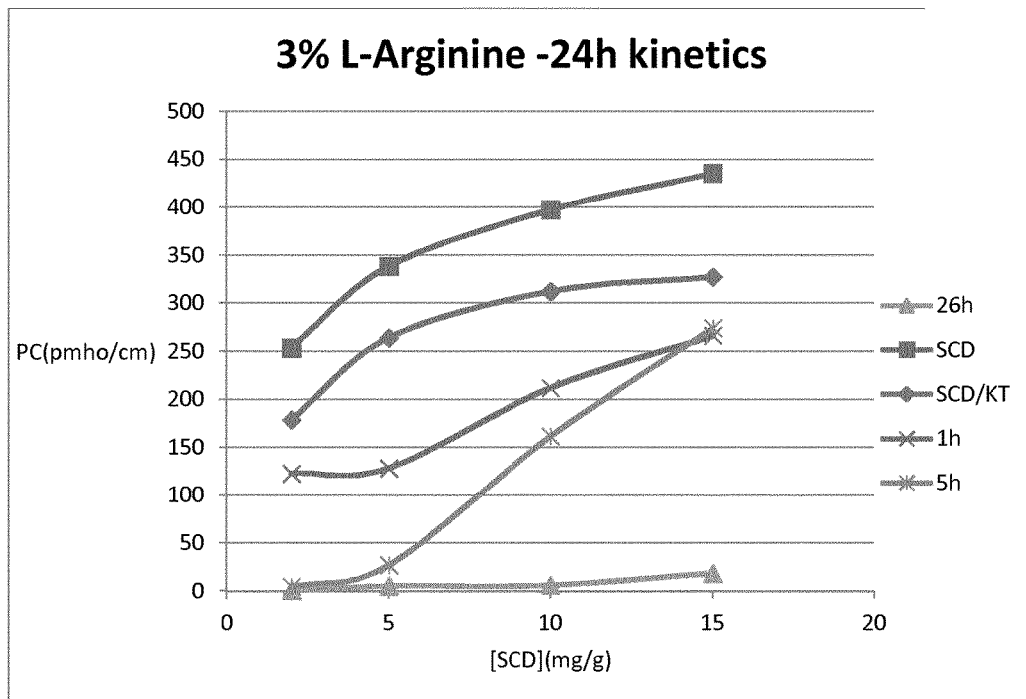
FIG. 9 shows the effect of 3% L-arginine and various concentrations of SCD on ink particle conductivity against those for Comparative Example 1.

A black electrostatic ink composition was made according to Example 2 except that, instead of using various amounts of citric acid, a concentration of 3% L-arginine ($pK_a$=2.17) was used. The L-arginine was sourced from Sigma-Aldrich®. FIG. 9 shows the effect of 3% L-arginine and various concentrations of SCD on ink particle conductivity against those for Comparative Example 1.

When using a bivalent chemical such as L-arginine, which is an amino acid containing a carboxyl group and an amine group, there is a reduction in charging with time.

The non stable charging indicates that the reduction in charging is due to the presence of the amino group and not to the effect of organic acids, otherwise the reduction in charging would be stable for at least the first 24-48 hours. In the amino acid, there is also a basic group. So, in general, there are two components that lower the charging, the acid and the basic group, using different mechanisms of interaction with the charge adjuvant. Another reason for the lower charging stability with time in the moderate acids is believed to be connected with the general observation that an ink with lower charging (i.e. lower particle conductivity) tends to lose charging more rapidly (in percents compared to start).

Example 11

Figure 10:
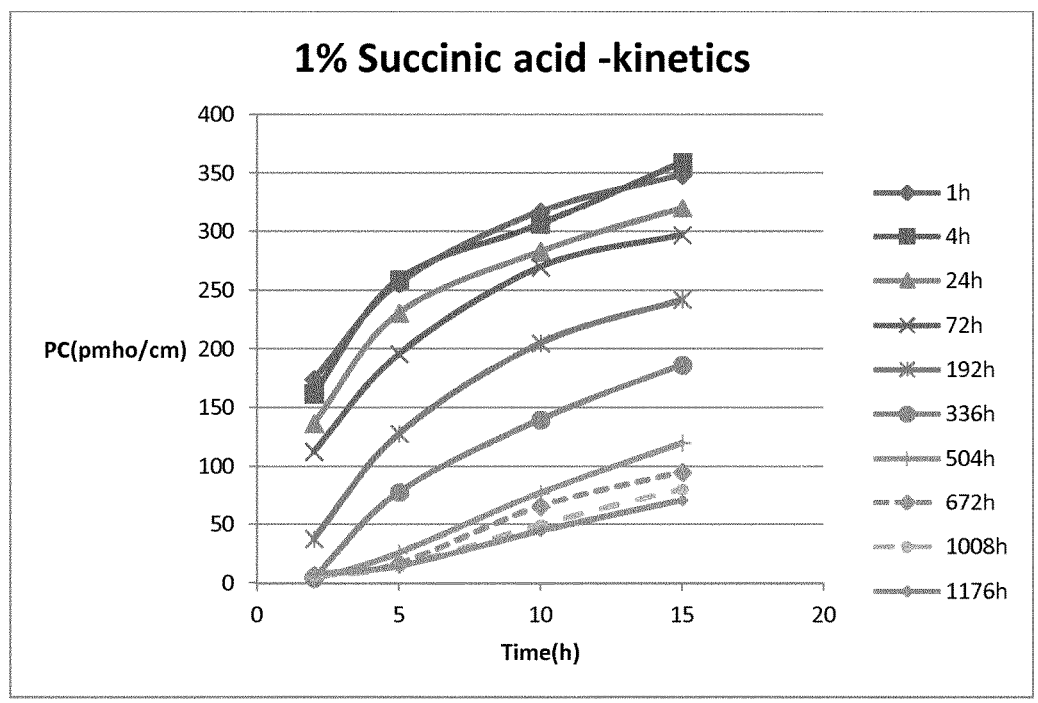
FIG. 10 shows the effect of 1% succininic acid and various concentrations of SCD on ink particle conductivity, after various time periods from when the ink working dispersion was charged by charge director.

The effect of charging stability over time was evaluated. A black electrostatic ink composition was made according to Example 2 except that, instead of using various amounts of citric acid, a concentration of 1% succininic acid was used. FIG. 10 shows the effect of 1% succininic acid and various concentrations of SCD on ink particle conductivity, after various time periods from when the ink working dispersion was charged by charge director.

It can be seen from FIG. 9 that, after longer times, the charging declines, i.e. when compared to reference ink charged by SCD only (with no acid additive in ink) the stability over time is worse when using an acidic additive. This is an indication of the earlier-suggested mechanism for this effect, a continuos process of blocking the charge director micelles.

Example 12

The response for charge director addition was evaluated. It is not enough just to reduce the charging of the ink at the start but also, during press operation with CD addition, to decrease the response in press developing unit.

Figure 11:
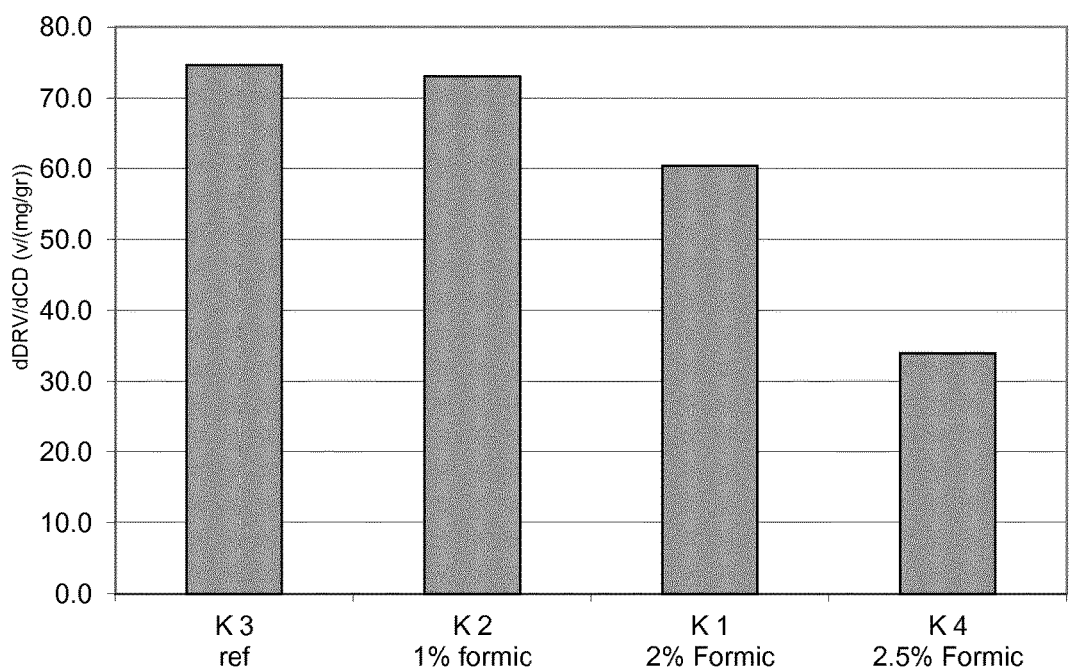
FIG. 11 shows the effect of various concentrations of formic acid on SCD additions (DRV response).

A black electrostatic ink composition was made according to Example 2 except that, instead of using various amounts of citric acid, various concentrations of formic acid were used. FIG. 11 shows the effect of various concentrations of formic acid on SCD additions (developer voltage response, sometimes termed DRV response).

The invention claimed is:

1. An electrostatic ink composition comprising:
   a) chargeable particles comprising a resin;
   b) a charge director comprising a sulfosuccinate salt of the general formula $MA_m$, wherein M is a metal, m is the valence of M, and A is an ion of the general formula (I):

(I)

wherein each of $R_1$ and $R_2$ is an alkyl group; and
c) a non-polymeric, non-fatty acid having a $pK_a$, when measured in water at 20° C., of at least 1.

2. The electrostatic ink composition according to claim 1, wherein the non-polymeric, non-fatty acid is selected from carboxylic acids, phenolic acids, amino acids, and optionally substituted uric acids.

3. The electrostatic ink composition according to claim 1, wherein the non-polymeric, non-fatty acid is a hydroxyacid.

4. The electrostatic ink composition according to claim 3, wherein the hydroxyacid is a substituted alkyl having at least one substituent that is a carboxyl group and at least one substituent that is a hydroxyl group, wherein the alkyl has from 2 to 10 carbons.

5. The electrostatic ink composition according to claim 1, wherein the non-polymeric, non-fatty acid is a polyacid.

6. The electrostatic ink composition according to claim 5, wherein the polyacid is of the formula $HO_2C\text{-}L\text{-}CO_2H$, wherein L is a single bond or an organic linker group selected from an optionally substituted aliphatic moiety and an optionally substituted aromatic moiety.

7. The electrostatic ink composition according to claim 1, wherein the non-polymeric, non-fatty acid is selected from citric acid, oxalic acid, succinic acid, lactic acid, uric acid, arginine and formic acid.

8. The electrostatic ink composition according to claim 1, wherein the non-polymeric, non-fatty acid has a $pK_a$, when measured in water at 20° C., of from 3 to 6.

9. The electrostatic ink composition according to claim 1, wherein the non-polymeric, non-fatty acid constitutes from 0.5 wt % to 4 wt % of the solids of the electrostatic ink composition.

10. The electrostatic ink composition according to claim 1, wherein the composition further includes a liquid carrier and the chargeable particles comprising the resin are dispersed in the liquid carrier.

11. A method of producing an electrostatic ink composition, the method involving:
producing chargeable particles comprising a resin;
and, before, during or after the chargeable particles comprising the resin are produced, combining the resin with
(i) a charge director comprising a sulfosuccinate salt of the general formula $MA_m$, wherein M is a metal, m is the valence of M, and A is an ion of the general formula (I):

[R_1—O—C(O)CH_2CH(SO_3)C(O)—O—R_2]^−  (I)

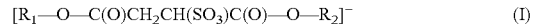

wherein each of $R_1$ and $R_2$ is an alkyl group, and
(ii) a non-polymeric, non-fatty acid having a $pK_a$, when measured in water at 20° C., of at least 1.

12. The method according to claim 11, wherein a liquid carrier, the resin and the non-polymeric, non-fatty acid are ground together before the charge director is added.

13. The method according to claim 12, wherein the resin is ground for a period of time, and the non-polymeric, non-fatty acid is added to the resin being ground during the last 50% of the period of time.

14. The method according to claim 12, wherein the resin is ground for a period of time, and the non-polymeric, non-fatty acid is added to the resin being ground during the first 50% of the period of time.

15. A print substrate having printed thereon an electrostatic ink composition comprising:
a) a resin;
b) a charge director comprising a sulfosuccinate salt of the general formula $MA_m$, wherein M is a metal, m is the valence of M, and A is an ion of the general formula (I):

[R_1—O—C(O)CH_2CH(SO_3)C(O)—O—R_2]^−  (I)

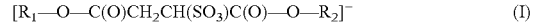

wherein each of $R_1$ and $R_2$ is an alkyl group; and
c) a non-polymeric, non-fatty acid having a $pK_a$, when measured in water at 20° C., of at least 1.

* * * * *